US011022207B2

United States Patent
Fox et al.

(10) Patent No.: US 11,022,207 B2
(45) Date of Patent: Jun. 1, 2021

(54) HYDRAULIC CONTROL UNIT FOR LIMITED SLIP DIFFERENTIAL

(71) Applicant: Eaton Intelligent Power Limited, Dublin (IE)

(72) Inventors: Matthew G. Fox, Ceresco, MI (US); Jeffrey A. Oesch, Marshall, MI (US); Andrew N. Edler, Homer, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/803,381

(22) Filed: Feb. 27, 2020

(65) Prior Publication Data

US 2020/0200192 A1 Jun. 25, 2020

Related U.S. Application Data

(63) Continuation of application No. PCT/US2018/049210, filed on Aug. 31, 2018.
(Continued)

(51) Int. Cl.
*F16H 48/32* (2012.01)
*F16H 61/00* (2006.01)
(Continued)

(52) U.S. Cl.
CPC .............. *F16H 48/32* (2013.01); *F15B 1/04* (2013.01); *F15B 1/265* (2013.01); *F15B 15/18* (2013.01);
(Continued)

(58) Field of Classification Search
None
See application file for complete search history.

(56) References Cited

U.S. PATENT DOCUMENTS 6,626,056 B2 * 9/2003 Albert ................ F16H 61/0009
74/335
9,200,705 B2 * 12/2015 Garabello ........... F16H 61/0009
(Continued)

FOREIGN PATENT DOCUMENTS

EP          1994286 B1      3/2010
WO   WO-2015157511 A1 * 10/2015  ............. F16H 61/12

OTHER PUBLICATIONS

International Search Report and Written Opinion for International Application No. PCT/US2018/049210 dated Dec. 26, 2018.

*Primary Examiner* — Michael Leslie
*Assistant Examiner* — Michael Quandt
(74) *Attorney, Agent, or Firm* — RMCK Law Group PLC (57) ABSTRACT

A hydraulic control unit that delivers hydraulic fluid to a limited slip differential includes a hydraulic control unit housing, a motor and a pump. The hydraulic control unit housing has a manifold housing portion and an accumulator housing portion. The manifold housing portion defines a fluid pathway arrangement for communicating fluid along at least a first fluid pathway. The accumulator housing portion houses an accumulator assembly having a biasing assembly and a piston. The accumulator housing portion and manifold housing portion cooperate to form an accumulator chamber that houses the biasing assembly. The motor is disposed on the first side of the manifold housing portion. The pump is disposed on a second side of the manifold portion, opposite the first side. The pump is configured to pump fluid into the accumulator chamber of the accumulator housing portion.

17 Claims, 7 Drawing Sheets

Related U.S. Application Data

(60) Provisional application No. 62/553,329, filed on Sep. 1, 2017.

(51) Int. Cl.
*F16H 57/037* (2012.01)
*F15B 1/04* (2006.01)
*F15B 1/26* (2006.01)
*F15B 15/18* (2006.01)
*F16D 25/0638* (2006.01)
*F16H 57/02* (2012.01)

(52) U.S. Cl.
CPC .. *F15B 2201/4056* (2013.01); *F16D 25/0638* (2013.01); *F16H 57/037* (2013.01); *F16H 61/0009* (2013.01); *F16H 2057/02026* (2013.01); *F16H 2061/0034* (2013.01)

(56) References Cited

U.S. PATENT DOCUMENTS

| | | | |
|---|---|---|---|
| 9,200,706 B2* | 12/2015 | Garabello | F16H 61/0009 |
| 9,239,066 B2* | 1/2016 | Sugo | B60K 17/348 |
| 9,995,348 B2* | 6/2018 | Yamamori | F16D 25/14 |
| 2005/0167228 A1 | 8/2005 | Baxter | |
| 2006/0175239 A1 | 8/2006 | Johnson et al. | |
| 2009/0064674 A1* | 3/2009 | Davidsson | F15B 21/044 |
| | | | 60/422 |
| 2013/0333366 A1* | 12/2013 | Grethel | F16D 25/12 |
| | | | 60/327 |
| 2014/0219848 A1 | 8/2014 | Rabhi | |
| 2016/0160982 A1* | 6/2016 | Edler | F04C 15/0023 |
| | | | 418/61.3 |
| 2017/0045127 A1 | 2/2017 | Fisher et al. | |

* cited by examiner

HYDRAULIC CONTROL UNIT FOR LIMITED SLIP DIFFERENTIAL

CROSS-REFERENCE TO RELATED APPLICATIONS

This application is a continuation of International Application No. PCT/US2018/049210 filed Aug. 31, 2018, which claims priority to U.S. Provisional Application No. 62/553,329 filed on Sep. 1, 2017. The disclosure of the above application is incorporated herein by reference.

FIELD

The present disclosure relates generally to limited slip differentials and more particularly to a hydraulic control unit that delivers hydraulic fluid to a limited slip differential.

BACKGROUND

Differentials are provided on vehicles to permit an outer drive wheel to rotate faster than an inner drive wheel during cornering as both drive wheels continue to receive power from the engine. While differentials are useful in cornering, they can allow vehicles to lose traction, for example, in snow or mud or other slick mediums. If either of the drive wheels loses traction, it will spin at a high rate of speed and the other wheel may not spin at all. To overcome this situation, limited-slip differentials were developed to shift power from the drive wheel that has lost traction and is spinning to the drive wheel that is not spinning. Electronically-controlled, limited-slip differentials can include a hydraulically-actuated clutch to limit differential rotation between output shafts of the differential. In some configurations a hydraulic delivery device may be located remote from the differential.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A hydraulic control unit that delivers hydraulic fluid to a limited slip differential includes a hydraulic control unit housing, a motor and a pump. The hydraulic control unit housing has a manifold housing portion and an accumulator housing portion. The manifold housing portion defines a fluid pathway arrangement for communicating fluid along at least a first fluid pathway. The accumulator housing portion houses an accumulator assembly having a biasing assembly and a piston. The accumulator housing portion and manifold housing portion cooperate to form an accumulator chamber that houses the biasing assembly. The motor is disposed on the first side of the manifold housing portion. The pump is disposed on a second side of the manifold portion, opposite the first side. The pump is configured to pump fluid into the accumulator chamber of the accumulator housing portion.

According to additional features, the pump is a gear pump. The manifold housing portion and the accumulator portion cooperate to define a reservoir. The reservoir is a distinct cavity from the accumulator chamber. A filter is disposed in the reservoir that filters fluid flowing through the reservoir. A first side of the filter is disposed against the manifold housing portion. A second side of the filter is disposed against the accumulator housing portion. The filter includes a framework that supports a mesh. The framework defines a seal over-molded around a perimeter thereof. The biasing assembly includes a first biasing member and a second biasing member. The first biasing member has a first spring rate. The second biasing member has a second spring rate, distinct from the first spring rate.

According to other features, the fluid pathway arrangement further defines a second fluid pathway. The first fluid pathway fluidly connects the pump, the accumulator assembly and a valve. The second fluid pathway fluidly connects the pump and the reservoir. The fluid pathway arrangement is plugged at only two openings defined on the manifold housing portion.

A hydraulic control unit constructed in accordance to another example of the present disclosure delivers hydraulic fluid to a limited slip differential and comprise a hydraulic control unit housing, a motor and a reservoir. The hydraulic control unit housing has a manifold housing portion and an accumulator housing portion. The manifold housing portion defines a fluid pathway arrangement for communicating fluid along at least a first fluid pathway. The accumulator housing portion houses an accumulator assembly having a biasing assembly and a piston. The accumulator housing portion and manifold housing portion cooperate to form an accumulator chamber that houses the biasing assembly. The motor drives a pump. The pump pumps fluid into the accumulator chamber of the accumulator housing portion. The reservoir is defined by the manifold housing portion and the accumulator housing portion. The reservoir is distinct from the accumulator chamber.

In other features, a filter is disposed in the reservoir that filters fluid flowing through the reservoir. A first side of the filter is disposed against the manifold housing portion. A second side of the filter is disposed against the accumulator housing portion. The filter includes a framework that supports a mesh. The framework defines a seal over-molded around a perimeter thereof. The biasing assembly includes a first biasing member and a second biasing member. The first biasing member has a first spring rate. The second biasing member has a second spring rate, distinct from the first spring rate.

According to other features, the fluid pathway arrangement further defines a second fluid pathway. The first fluid pathway fluidly connects the pump, the accumulator assembly and a valve. The second fluid pathway fluidly connects the pump and the reservoir. The fluid pathway arrangement is plugged at only two openings defined on the manifold housing portion. A valve is coupled to the manifold housing portion. The valve is located intermediate the accumulator assembly and a hydraulic fluid coupling that delivers fluid to the limited slip differential.

BRIEF DESCRIPTION OF THE DRAWINGS

The present disclosure will become more fully understood from the detailed description and the accompanying drawings, wherein.

DETAILED DESCRIPTION

Figure 1:
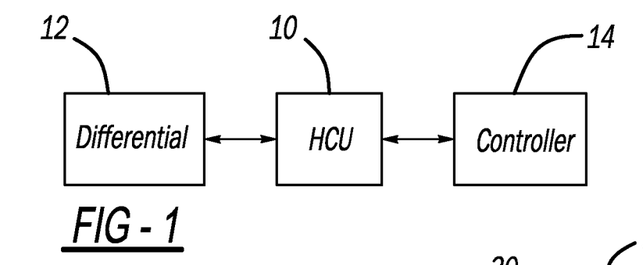
FIG. 1 is a schematic illustration of a limited slip differential, hydraulic control unit and controller according to one example of the present disclosure.

With initial reference to FIG. 1, a hydraulic control unit constructed in accordance to one example of the present disclosure is shown and generally identified with reference numeral 10. As will become appreciated herein, the hydraulic control unit 10 according to the present disclosure provides a single unit that can be mounted against or relative to an axle housing (not specifically shown). In general, the hydraulic control unit 10 can deliver hydraulic fluid to a limited slip differential 12 based on a signal communicated from a controller 14. The limited slip differential 12 can be housed in the axle housing through a hydraulic fluid coupling 20. The limited slip differential 12 can be an electronic limited slip differential having a clutch and a piston (not specifically shown).

The limited slip differential 12 can operate to drive a pair of axle shafts that are connected to a pair of respective drive wheels (not shown). In general, the limited slip differential 12 functions as a traditional open differential during normal operating conditions until an event occurs where a bias torque is required. When a loss in traction is detected or anticipated, the clutch can be selectively actuated in order to generate the optimum bias ratio for the situation.

The limited slip differential 12 can further include a differential gear assembly configured in a differential case that acts to allow the axle shafts to rotate at different speeds. The differential gear assembly 12 can include a pair of side gears (not specifically shown) that are mounted for rotation with the axle shafts (and the drive wheels). In an open configuration, described below, the differential gear assembly 12 acts to allow the axle shafts to rotate at different speeds.

The clutch couples a drive shaft output with the differential gear assembly 12. The clutch can include a clutch pack (not specifically shown) that has a plurality of annular plates interleaved between a plurality of annular friction disks. The plurality of annular plates and annular friction disks are interleaved between one another and act to rotate past one another in substantially non-contacting relationship when the clutch is in its open position. However, it will be appreciated by those skilled in the art that the term "non-contacting" as used herein is relative and is not meant to necessarily indicate that the annular plates and annular friction disks have absolutely no contact when the clutch is in the open condition. The annular plates and annular friction disks are axially movable into frictional engagement relative to one another, thereby reducing relative rotation between the annular plates and annular friction disks when the clutch is in the closed or partially closed configurations.

In this manner, when the clutch is in its closed position, the side gears, as well as the axle shafts and the drive wheels rotate together.

The clutch can operate in an open configuration to allow the side gears to rotate independently from each other, e.g., at different speeds. The clutch can also operate in a closed or partially closed configuration where the side gears rotate together or partially together (that is, not independently), e.g., at substantially the same speed. The clutch is a hydraulic clutch that utilizes pressurized hydraulic fluid provided through the hydraulic fluid coupling 20 from the hydraulic control unit 10 to act on the piston to selectively actuate the clutch pack between the open, closed and partially closed configurations. It will be appreciated that the limited slip differential 12 described above is merely exemplary. In this regard, the hydraulic control unit 10 can be used to deliver hydraulic fluid to an actuator (piston, etc.) of any limited slip differential configuration.

With general reference now to FIGS. 1-4, the hydraulic control unit 10 will be described in greater detail. The hydraulic control unit 10 can generally include a hydraulic control unit housing 30 having a manifold housing portion 32, an accumulator housing portion 34 and a motor housing portion 36. The hydraulic control unit housing 30 defines a plurality of mounting bores 38 for receiving fasteners when bolting the hydraulic control unit 10 onto an axle housing. A solenoid valve 40 is provided on the hydraulic control unit 10. In general, the solenoid valve 40 opens and closes to allow hydraulic fluid to communicate with the limited slip differential 12.

The hydraulic control unit 10 includes a pump assembly 50 and an accumulator assembly 54. The pump assembly 50 has a motor 56, a pump 58. According to the present disclosure, the motor 56 and the pump 58 are disposed on opposite sides of the manifold housing portion 32. Specifically, the motor 56 is disposed on a first side 60 of the manifold housing portion 32 while the pump 58 is disposed on a second side 62 of the manifold housing portion 32. The arrangement provides an efficient arrangement for pumping fluid through the manifold housing portion 32 as will be described herein.

Figure 4:
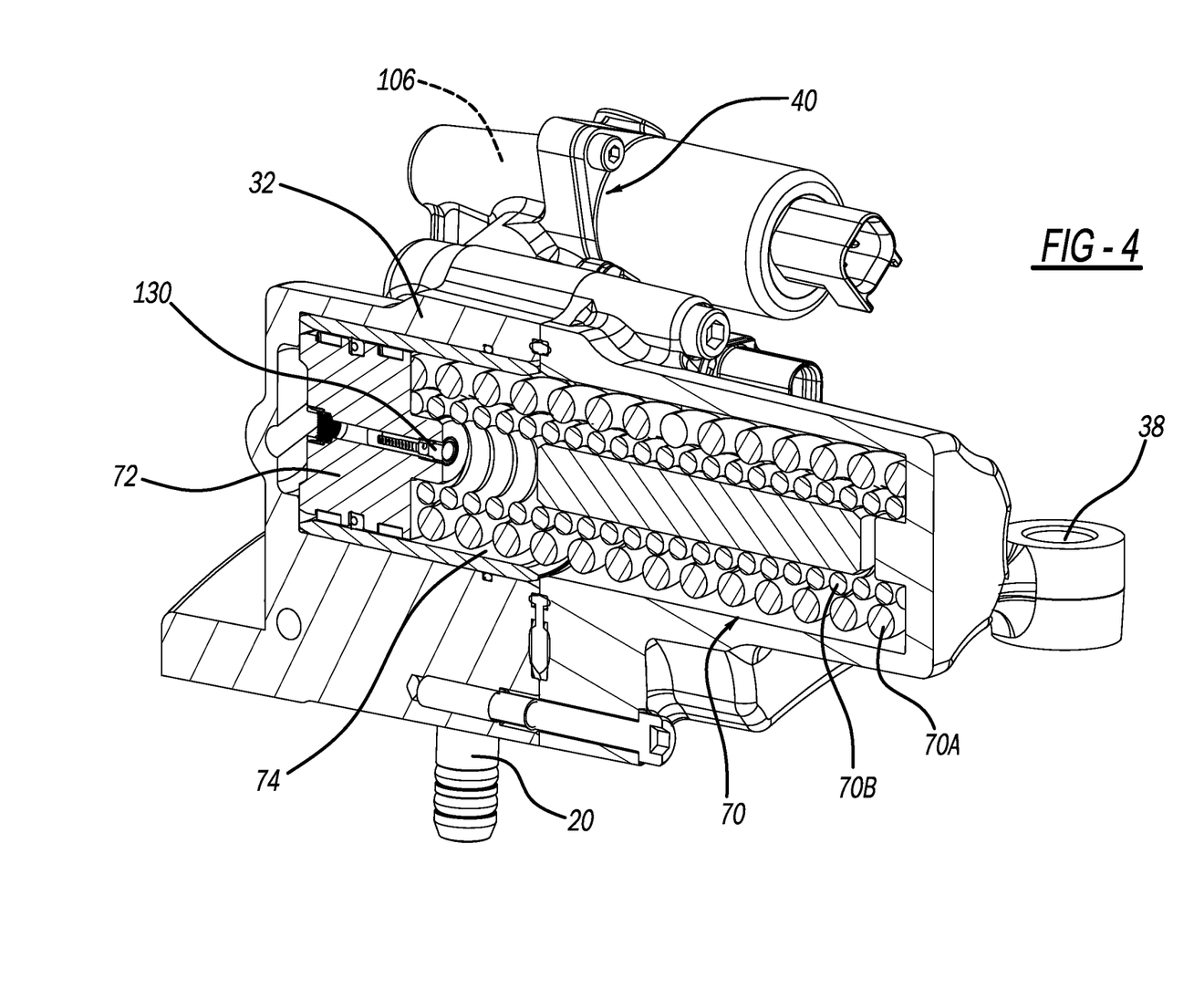
FIG. 4 is a sectional view of an accumulator of the hydraulic control unit taken along lines 4-4 of FIG. 2A

The accumulator assembly 54 includes a biasing assembly 70 and a piston 72 received within an accumulator chamber 74 (FIG. 4). The biasing assembly 70 includes first and second biasing members 70A and 70B. The first biasing member 70A has a first spring rate while the second biasing member 70B has a second spring rate. The first and second spring rates cooperate together to provide a desired spring rate for the biasing assembly 70. As will become appreciated herein, fluid is pumped behind the piston 72 into the accumulator chamber 74 to cause the piston 72 to translate toward the first and second biasing members 70A, 70B. As can be appreciated, fluid is pressurized when in the accumulator chamber on an opposite side of the piston 72 as the biasing assembly 70.

Figure 5:
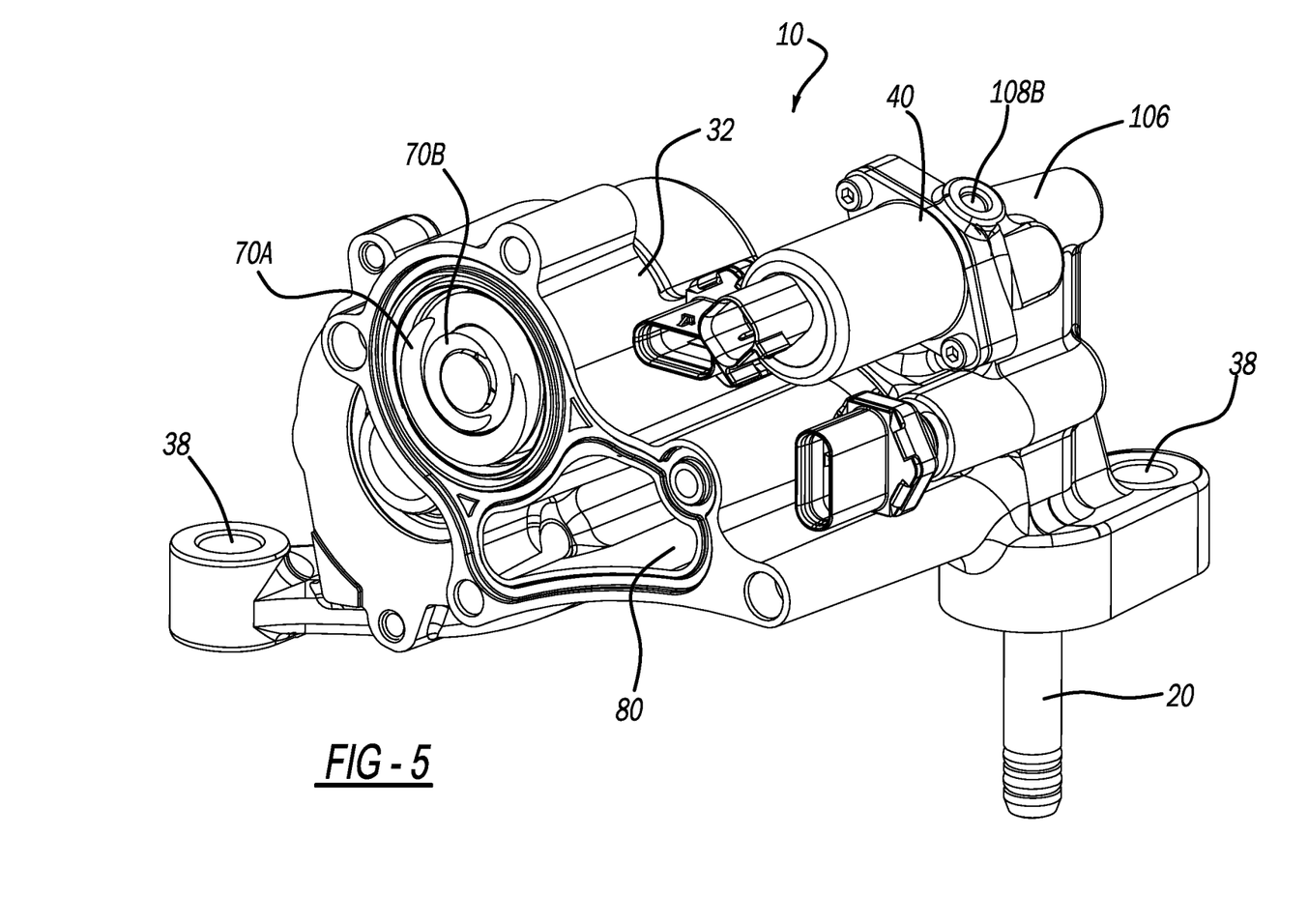
FIG. 5 is a rear perspective view of the hydraulic control unit of FIG. 2A shown with the accumulator housing and motor removed for illustration.
Figure 6:
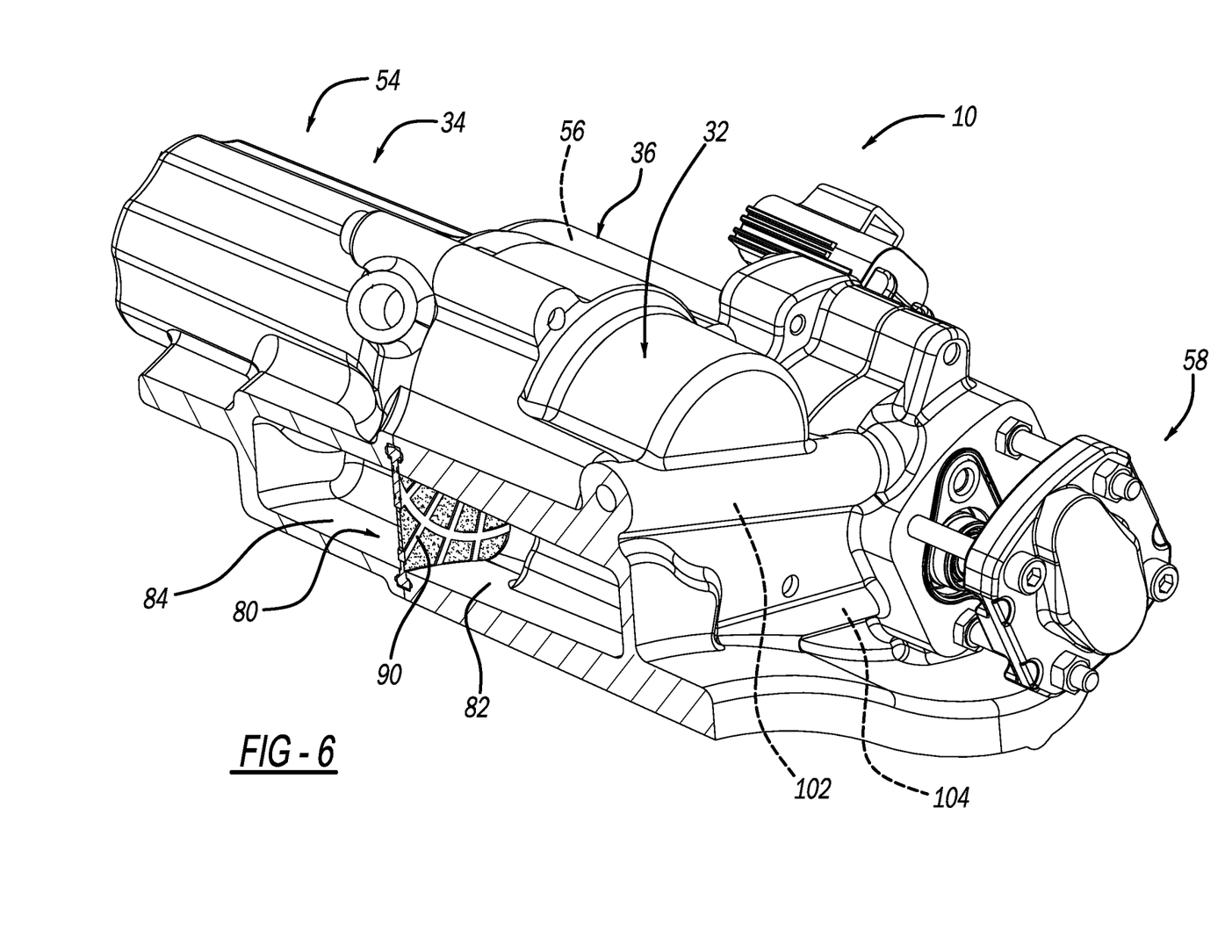
FIG. 6 is a sectional view of a reservoir of the hydraulic control unit taken along lines 6-6 of FIG. 2A.
Figure 7:
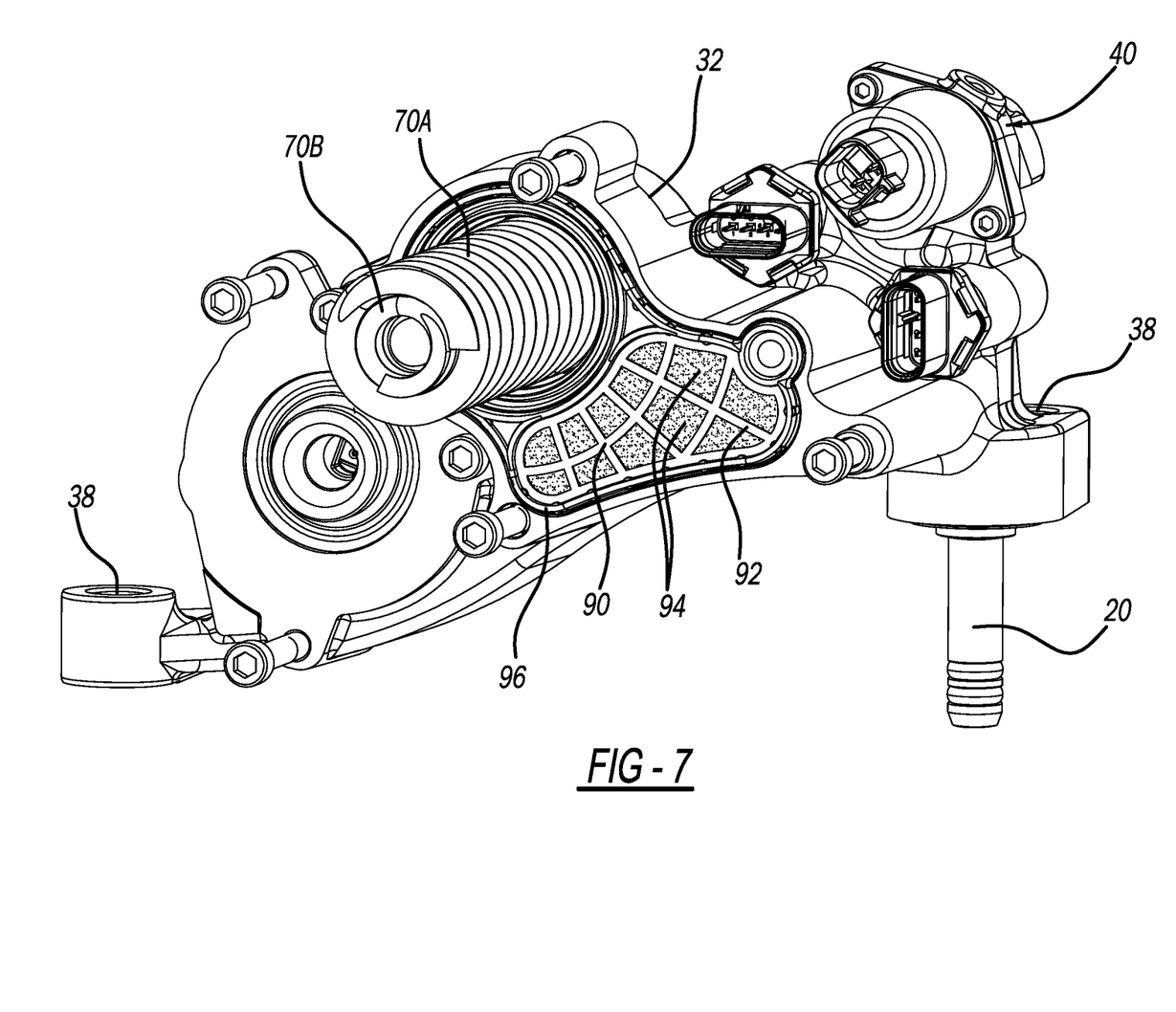
FIG. 7 is another sectional view of the hydraulic control unit as shown in FIG. 5 with a filter constructed in accordance to one example of the present teachings shown installed for filtering fluid passing through the reservoir.

Referring now to FIGS. 5-7, the manifold housing portion 32 and the accumulator housing portion 34 cooperate to define a reservoir 80. The reservoir 80 is vented to atmosphere. The reservoir 80 is a distinct cavity from the accumulator assembly 54 and can be located generally under the accumulator assembly 54. By moving the reservoir away from the accumulator chamber 74, debris and contamination that may be generated by the biasing assembly 70 can be better managed. In particular, the manifold housing portion 32 defines an upstream reservoir portion 82 and the accumulator housing portion 34 defines a downstream reservoir portion 84. A filter 88 is disposed between the manifold housing portion 32 and the accumulator housing portion 34. The filter 88 filters hydraulic fluid as it passes from the upstream reservoir portion 82 to the downstream reservoir portion 84. The filter 88 includes a framework 92 that supports a mesh 94. A seal 96 can be over-molded or otherwise formed around a perimeter of the framework 92 and operates as a seal between the manifold housing portion 32 and the accumulator housing portion 34 in an assembled position. The filter 88 provides significant flow area for optimally filtering hydraulic fluid while minimizing flow rate loss.

Figure 2A:
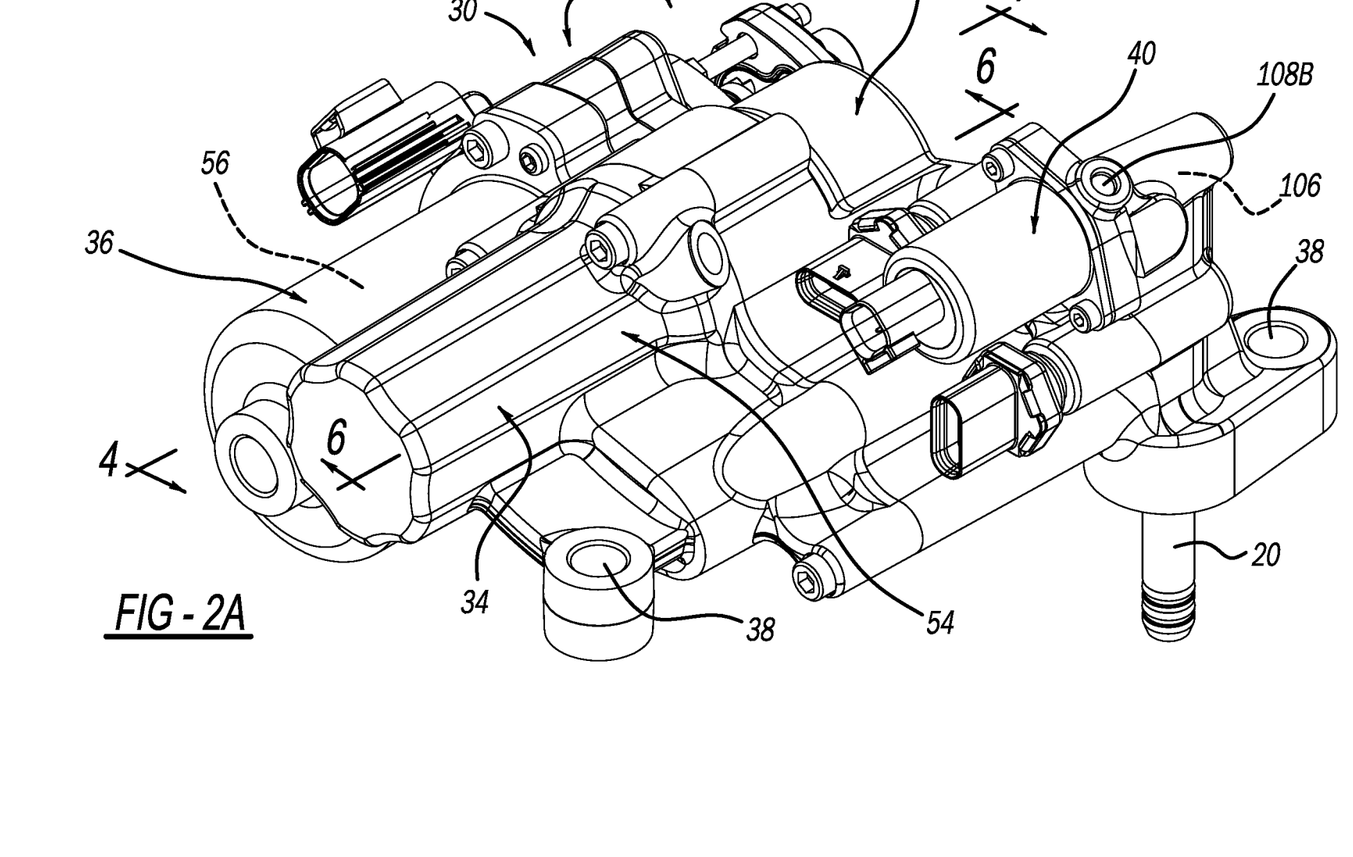
FIG. 2A is rear perspective view of a hydraulic control unit constructed in accordance to one example of the present disclosure.
Figure 2B:
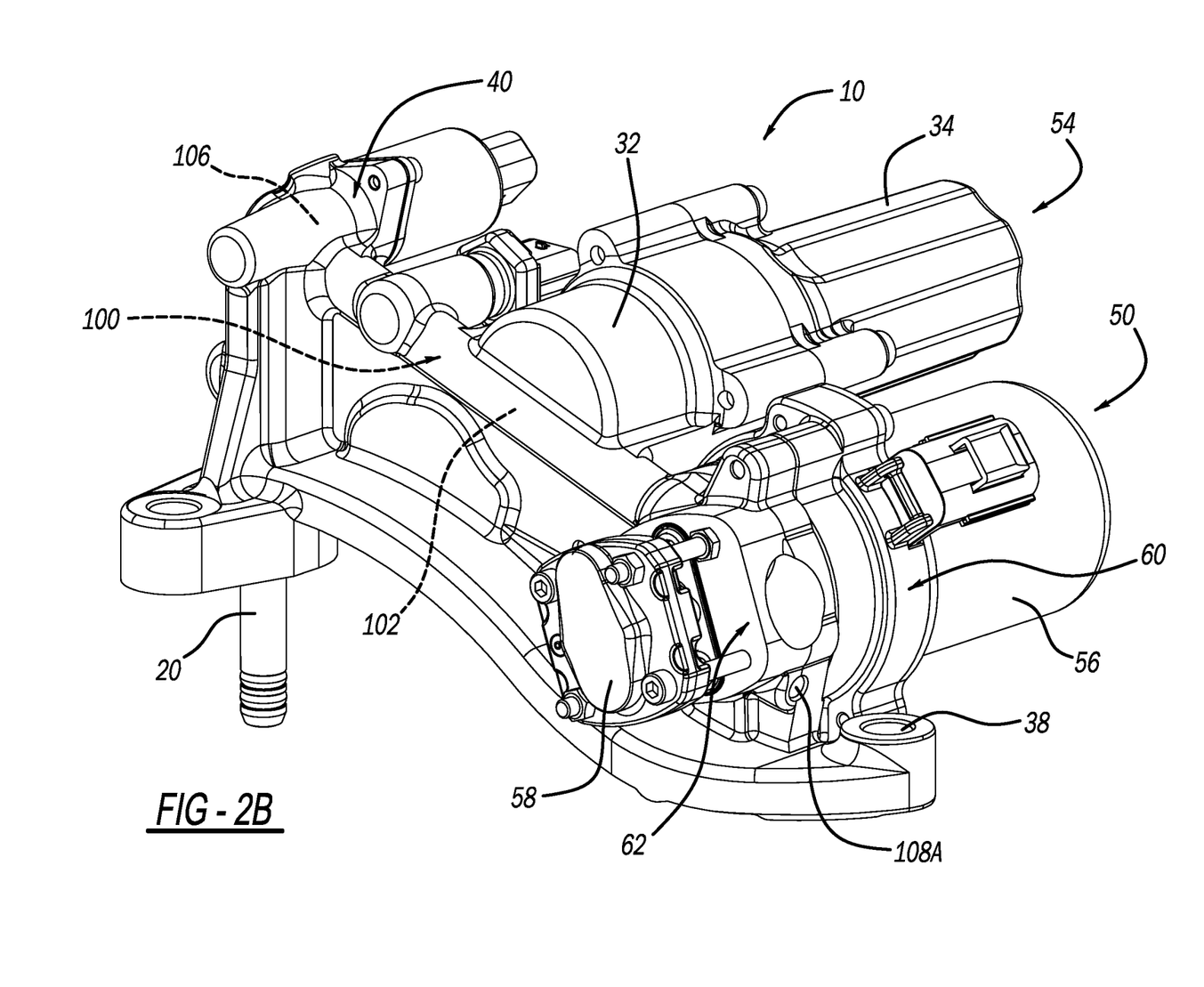
FIG. 2B is front perspective view of the hydraulic control unit shown in FIG. 2A.
Figure 3:
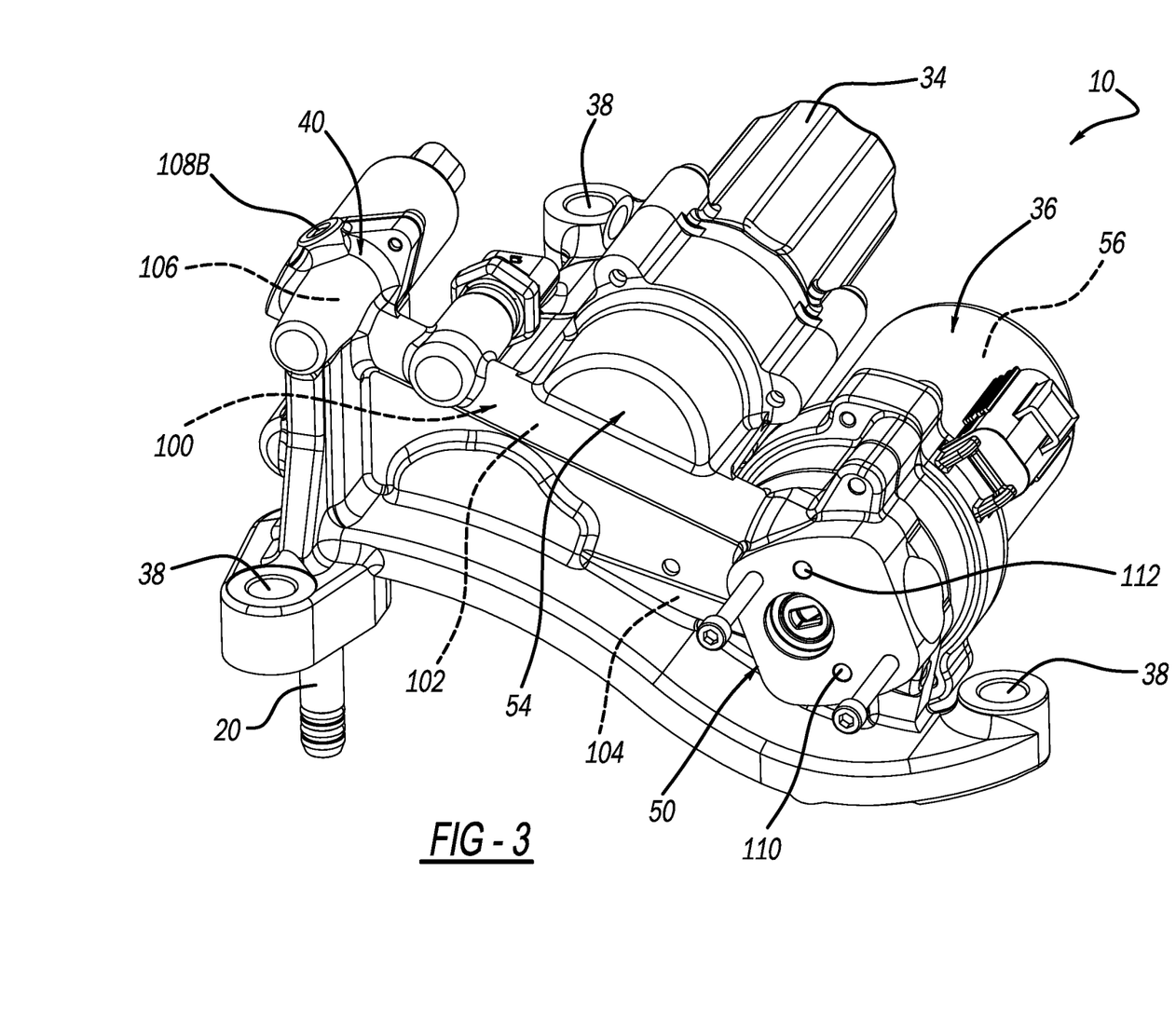
FIG. 3 is a rear perspective view of the hydraulic control unit of FIG. 2B and shown with the pump removed for illustration.

With particular reference now to FIGS. 2B and 3, the manifold housing portion 32 will now be described in greater detail. As will become appreciated, the manifold housing portion 32 provides minimal fluid paths with minimal changes in direction to reduce reaction time and simplify manufacturing. In this regard, the manifold portion 32 defines a fluid pathway arrangement 100 having a first fluid pathway 102 and a second fluid pathway 104. The manifold portion 32 further defines a dump chamber 106 where fluid returning from the differential assembly 12 is routed back to the reservoir 80. The first fluid pathway 102 fluidly connects the solenoid valve 40, the accumulator assembly 54 and the pump assembly 50. The second fluid pathway 104 fluidly connects the pump assembly 50 to the reservoir 80. The fluid pathway is simplified and requires plugging openings in the manifold housing portion 32 only at low-pressure locations. As viewed in FIG. 2B, a first ball 108A is shown plugging a first opening and in FIGS. 3 and 5, a second ball 108B is shown plugging a second opening.

During operation, low-pressure fluid flows from the reservoir through the second fluid pathway 104. Fluid exits a low-pressure port 110 (FIG. 3) and is pumped by the pump 58 out of a high-pressure port 112 and to the accumulator assembly 54 through the first fluid pathway 102. The accumulator assembly 54 is said to be "charged" when fluid causes the piston 72 to stroke. When fluid is requested to be delivered to the limited slip differential 12, the valve 40 is opened and the piston 72 is caused to stroke in a direction leftward as viewed in FIG. 4 upon urging from the biasing assembly 70. High pressure hydraulic fluid leaves the accumulator chamber 72, flows along the first fluid pathway from the accumulator chamber 72 to the valve 40 and out through the hydraulic fluid coupling 20 to the clutch of the limited slip differential 12. Notably only one change of direction is generally required for the fluid to undergo at the valve 40. Additionally, the valve 40 is positioned generally adjacent to or above the hydraulic fluid coupling 20 reducing necessary distance to communicate hydraulic fluid from the accumulator assembly 54 and out of the hydraulic fluid coupling 20.

The hydraulic control unit 10 can further include a clutch piston pressure sensor, an accumulator pressure sensor and a three-way proportional regulating valve. The clutch piston pressure sensor can be threadably or otherwise securely received by the hydraulic control unit housing 30. The clutch piston pressure sensor can be configured to measure a pressure at the piston of the limited slip differential. The accumulator pressure sensor can be threadably or otherwise securely received by the hydraulic control unit housing 30. The accumulator pressure sensor can be configured to measure a pressure in the accumulator chamber 74. The three-way proportional regulating valve can be securely coupled to the hydraulic control unit housing 30. The three-way proportional regulating valve can be configured to regulate fluid pressure within the unitary hydraulic control unit housing 30.

The motor 56 can operate the pump 58 and can be conventionally constructed. The pump 58 is a bolt-on gear pump that is bolted onto the manifold housing portion 32. The pump 58 can cause a pumping action on the fluid contained in the reservoir 80 of the hydraulic control unit housing 50. The pumping action ultimately causes the fluid to be pumped into the accumulator chamber 74. In doing so, the biasing members 70A, 70B at least partially collapse and introduces a pre-charge into the system. In this regard, the motor 56 is not required to run constantly. The fluid pressure can be introduced into the limited slip differential 12 by the biasing members 70A, 70B acting on the piston 72 when the solenoid valve 40 is opened (by a signal sent from the controller 14). A pressure relief valve 130 can be provided in the piston 72. The pressure relief valve 130 can protect the system by releasing fluid in the event of an over pressure malfunction.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A hydraulic control unit that delivers hydraulic fluid to a limited slip differential, the hydraulic control unit comprising:
    a hydraulic control unit housing having a manifold housing portion and an accumulator housing portion, wherein the manifold housing portion defines a fluid pathway arrangement for communicating fluid along at least a first fluid pathway, wherein the accumulator housing portion houses an accumulator assembly having a biasing assembly and a piston, the accumulator housing portion and manifold housing portion cooperating to form an accumulator chamber that houses the biasing assembly and the piston, wherein the fluid pathway arrangement is plugged at only two openings defined on the manifold housing portion;
    a motor disposed on a first side of the manifold housing portion; and
    a pump disposed on a second side of the manifold portion, opposite the first side, wherein the pump is configured to pump fluid into the accumulator chamber of the accumulator housing portion.

2. The hydraulic control unit of claim 1 wherein the pump is a gear pump.

3. The hydraulic control unit of claim 1 wherein the manifold housing portion and the accumulator housing portion cooperate to define a reservoir.

4. The hydraulic control unit of claim 3 wherein the reservoir is a distinct cavity from the accumulator chamber.

5. The hydraulic control unit of claim 4, further comprising a filter disposed in the reservoir that filters fluid flowing through the reservoir.

6. The hydraulic control unit of claim 5 wherein a first side of the filter is disposed against the manifold housing portion and a second side of the filter is disposed against the accumulator housing portion.

7. The hydraulic control unit of claim 6 wherein the filter includes a framework that supports a mesh, the framework defining a seal over-molded around a perimeter thereof.

8. The hydraulic control unit of claim 1 wherein the biasing assembly further comprises:
a first biasing member having a first spring rate; and
a second biasing member having a second spring rate, wherein the first and second spring rates are distinct.

9. The hydraulic control unit of claim 1 wherein the fluid pathway arrangement further defines a second fluid pathway, wherein the first fluid pathway fluidly connects the pump, the accumulator assembly and a valve, wherein the second fluid pathway fluidly connects the pump and the reservoir.

10. A hydraulic control unit that delivers hydraulic fluid to a limited slip differential, the hydraulic control unit comprising:
a hydraulic control unit housing having a manifold housing portion and an accumulator housing portion, wherein the manifold housing portion defines a fluid pathway arrangement for communicating fluid along at least a first fluid pathway, wherein the accumulator housing portion houses an accumulator assembly having a biasing assembly and a piston, the accumulator housing portion and manifold housing portion cooperating to form an accumulator chamber that houses the biasing assembly and the piston;
a motor that drives a pump, wherein the pump pumps fluid into the accumulator chamber of the accumulator housing portion;
a reservoir defined by the manifold housing portion and the accumulator housing portion, the reservoir being distinct from the accumulator chamber; and
a filter disposed in the reservoir that filters fluid flowing through the reservoir, wherein a first side of the filter is disposed against the manifold housing portion and a second side of the filter is disposed against the accumulator housing portion.

11. The hydraulic control unit of claim 10 wherein the filter includes a framework that supports a mesh, the framework defining a seal over-molded around a perimeter thereof.

12. The hydraulic control unit of claim 10 wherein the biasing assembly further comprises:
a first biasing member having a first spring rate; and
a second biasing member having a second spring rate, wherein the first and second spring rates are distinct.

13. The hydraulic control unit of claim 10 wherein the fluid pathway arrangement further defines a second fluid pathway, wherein the first fluid pathway fluidly connects the pump, the accumulator assembly and a valve, wherein the second fluid pathway fluidly connects the pump and the reservoir.

14. The hydraulic control unit of claim 10 wherein the fluid pathway arrangement is plugged at only two openings defined on the manifold housing portion.

15. The hydraulic control unit of claim 14, further comprising a valve coupled to the manifold housing portion and located intermediate the accumulator assembly and a hydraulic fluid coupling that delivers fluid to the limited slip differential.

16. A hydraulic control unit that delivers hydraulic fluid to a limited slip differential, the hydraulic control unit comprising:
a hydraulic control unit housing having a manifold housing portion and an accumulator housing portion, wherein the manifold housing portion defines a fluid pathway arrangement for communicating fluid along at least a first fluid pathway, wherein the accumulator housing portion houses an accumulator assembly having a biasing assembly and a piston, the accumulator housing portion and manifold housing portion cooperating to form an accumulator chamber that houses the biasing assembly and the piston;
a motor disposed on a first side of the manifold housing portion;
a pump disposed on a second side of the manifold portion, opposite the first side, wherein the pump is configured to pump fluid into the accumulator chamber of the accumulator housing portion;
a reservoir defined by the manifold housing portion and the accumulator housing portion, the reservoir being distinct from the accumulator chamber; and
a filter disposed in the reservoir that filters fluid flowing through the reservoir, wherein a first side of the filter is disposed against the manifold housing portion and a second side of the filter is disposed against the accumulator housing portion.

17. The hydraulic control unit of claim 16 wherein the filter includes a framework that supports a mesh, the framework defining a seal over-molded around a perimeter thereof.

* * * * *